United States Patent [19]

Laszlo

[11] Patent Number: 5,366,071
[45] Date of Patent: Nov. 22, 1994

[54] COMBINED WORKBENCH AND CARRY-CASE

[76] Inventor: Andrew Laszlo, 3 Locust La., Glen Head, N.Y. 11545

[21] Appl. No.: 196,571

[22] Filed: Feb. 15, 1994

[51] Int. Cl.⁵ .............................................. B65D 85/20
[52] U.S. Cl. .................................... 206/218; 206/373; 206/315.11
[58] Field of Search ............ 206/218, 372, 373, 315.11; 108/33, 34, 35; 312/258, 309; 144/285

[56] References Cited

U.S. PATENT DOCUMENTS

| | | | |
|---|---|---|---|
| 2,936,066 | 5/1960 | Meksula | 206/16 |
| 3,399,939 | 9/1968 | Anderson | 206/315.11 X |
| 3,948,579 | 4/1976 | Schirmer | 206/315.11 X |
| 4,285,556 | 8/1981 | Loeffel | 206/372 X |
| 4,319,683 | 3/1982 | Correa, III | 206/349 |
| 4,378,828 | 4/1983 | Shiminski | 144/285 |
| 4,790,432 | 12/1988 | Rees | 206/315.11 |
| 4,894,581 | 1/1990 | Roberts | 312/305 |
| 5,052,555 | 10/1991 | Harmon | 206/315.11 |

Primary Examiner—Jacob K. Ackun, Jr.
Attorney, Agent, or Firm—Natter & Natter

[57] ABSTRACT

A combined workbench for a fly-fisherman is collapsible to form a storage and carry-case. The workbench includes a main body unit having storage compartments and removable cover panels for providing a work surface. A lid member providing storage compartments is attached along a back edge of the main unit. Wing tray units provide auxiliary storage areas on either side of the main body unit. A clamp assembly stowed within the main body is adapted for securing a fly-tying vise in selected operational portions. A leg compartment in the main body houses fold-out legs that are selectively deployable for supporting the workbench. A frame assembly pivotally attached within the leg compartment is swingably deployable for holding a waste disposal bag.

25 Claims, 3 Drawing Sheets

5,366,071

COMBINED WORKBENCH AND CARRY-CASE

BACKGROUND OF THE INVENTION

1. Field of the Invention

This invention pertains to support structures and especially to a workspace that is convertible to a carry-case suitable for transporting and storing of fishing equipment and supplies.

In particular, the combined workbench of this invention concerns a self-contained fisherman's fly-tying work station.

2. Background Information

The sport of fly-fishing involves the fabrication of replica aquatic insects, such as flies, that are applied to fish hooks as lures. The crafting of artificial flies is referred to as "fly-tying" for the reason that fishermen "tie" their own flies duplicating species which are attractive to various types of fish. The fly-tying process requires an available supply of materials such as feathers, fur, yarn, thread, liquid cement or adhesive, solvent, etc. Additionally, appropriate tools such as scissors, tweezers and pliers are required. Desirable working conditions include an elevated work surface, a magnifying system and a worklight. Another essential implement for fly-tying is a vise for holding the fish hook during the process of tying or designing the "fly".

Several devices have been developed for the fly-fisherman including cabinets, benches, storage pouches and equipment containers. These devices however, do not encompass the benefits and advantages of containing within a unitary apparatus, all of the necessary supplies and equipment for fly-tying and further having the capability to unfold and function as a take-along workspace. For example, a typical table and cabinet for fly-tying is shown in U.S. Pat. No. 4,894,581. A shortcoming of that device is that it is not collapsible and therefore is not readily portable for transport to site locations by the fly-fisherman.

A portable soft-pack tote bag for carrying fly-tying materials is disclosed in U.S. Pat. No. 5,052,555. A disadvantage of this arrangement is that it does not provide the combined convenience of a workbench, as in the present invention nor does it provide for self-containment of all the essential supplies, tools and other equipment.

A combined workbench and tool carrier is disclosed in U.S. Pat. No. 4,378,828 however, that device is not designed for the fly-fisherman and is deficient in that it does not provide compartmented storage and cannot be transformed into a compact carry-case.

SUMMARY OF THE INVENTION

The nature of this invention concerns a portable workbench that is optionally changeable to a storage and carry-case.

The workbench includes a compartmented main body unit, swing-out wing tray units and a lid member. A leg compartment, below the main body unit, stows a fold-out leg assembly. The main body unit includes partitioned stowage areas for tools and supplies and removable cover panels for providing an elevated horizontal work surface.

A feature of the workbench is that the main body unit houses a clamp assembly that is universally adapted to lockingly engage a commercially available fisherman's fly-tying vise in a stowage mode and alternatively, for adjustably securing the vise in an operational mode. The lower compartment additionally houses a support frame for holding a waste disposal bag.

In view of the foregoing, it should be apparent that the present invention overcomes many of the shortcomings and deficiencies of the prior art and provides an improved combined workbench and carry-case.

Having thus summarized the invention, it will be seen that it is an object thereof to provide a combined workbench and carry-case of the general character described herein which is not subject to the aforementioned limitations.

Another object of this invention is to provide a combined workbench particularly adapted for the fly-tying fisherman that is convertible to a compact storage and carry-case.

A further object of this invention is to provide a combined workbench including a clamp assembly for mounting a fly-tying vise in selected operational modes.

Still another object of this invention is to provide a combined workbench having a fold-out leg assembly with height adjustable legs.

Other objects of this invention will in part be apparent and in part will be pointed out hereinafter.

With these ends in view, the invention finds embodiment in certain combinations of elements and arrangements of parts by which the aforementioned objects and certain other objects are hereinafter attained, all as more fully described with reference to the accompanying drawings and the scope of which is more particularly pointed out and indicated in the appended claims.

BRIEF DESCRIPTION OF THE DRAWINGS

In the accompanying drawings in which is shown an exemplary embodiment of the invention.

DESCRIPTION OF THE PREFERRED EMBODIMENT

Figure 1:
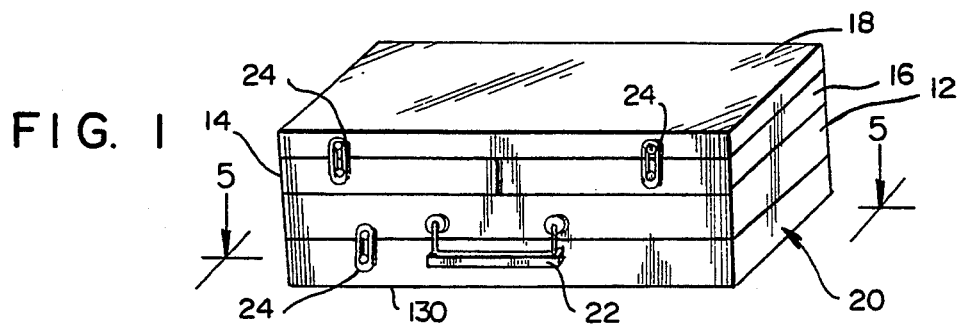
FIG. 1 is a perspective view of a combined workbench and carry-case in accordance with this invention showing the workbench converted to a carry-case.

Referring now in detail to the drawings, the reference numeral 10 denotes generally a combination workbench and carry-case as encompassed by this invention. It should be stressed that the particulars shown are by way of example and for the purpose of illustrative discussion of the preferred embodiment. In this regard, no attempt is made to show the structural aspects of the invention in more detail than is necessary for a fundamental understanding of the invention, the description taken with the drawings making apparent to those skilled in the art how the invention may be embodied in practice.

The workbench 10 includes a main body unit 12, a set of wing tray units 14, 16, a lid member 18, and a leg compartment 20. A swivel handle 22 is attached to the main body unit 12 and three sets of latches 24 are adapted for releasably retaining the components 12, 14, 16, 18 and 20 in an optional foldable configuration as shown in FIG. 1.

The workbench 10, in the folded configuration, is generally rectangular having typical dimensions of 24" in length, 14" in width and 8½ in heighth. By way of example, the workbench 10 can be hand-crafted from precious woods (e.g. oak, walnut, cherry). The latches 24 are preferably solid brass, gold-plated hardware. It should of course be understood that the workbench 10 can be constructed of other materials such as aluminum, plastics, etc. or a combination thereof and that equivalent hardware may be employed. Furthermore, the workbench 10, as described above, can also be modified by eliminating the leg compartment 20 and by substituting an external or independent folding leg sets and/or by omitting the wing tray units 14, 16.

Figure 2:
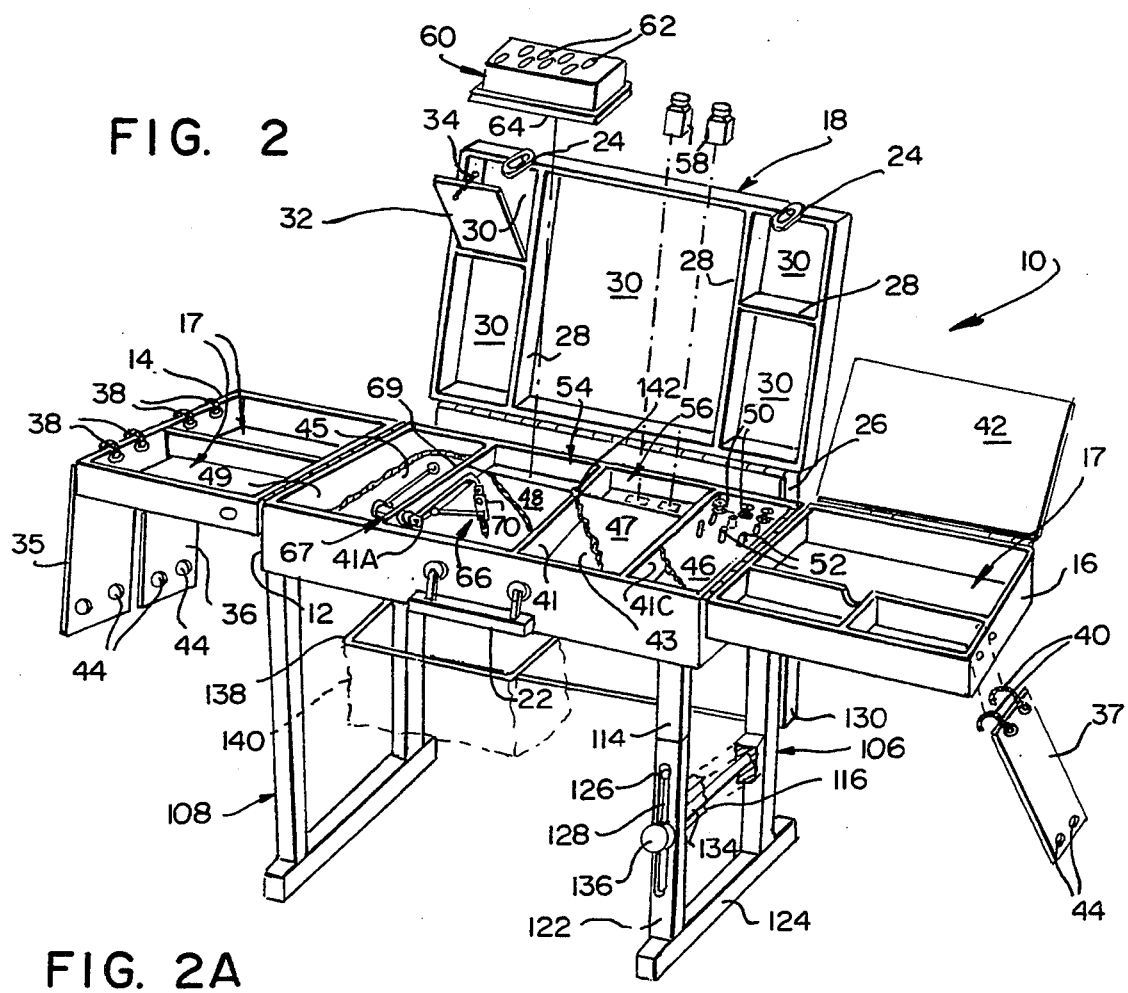
FIG. 2 is a partially exploded perspective view showing the workbench deployed to provide a workspace further illustrating, by broken-line view, a clamp assembly and a fly-tying vise in the locked and stowed position.

With reference now to FIG. 2, the workbench 10 is shown fully deployed for providing a workspace. The lid member 18 is hingedly attached to a connecting member 26 extending from a back wall 27 of the main body unit 12. The connecting member 26 corresponds in heighth to the heighth of the wing tray units 14, 16 and thus provides clearance for accommodation of the wing tray units 14, 16, in a stowed position when the lid member 18 is closed in an overlying interlocked relationship with regard to the main body unit 12. It should also be noted that the length dimension of each of the wing tray units 14, 16 corresponds to one-half the length dimension of the main body unit 12 wherein the wing tray units 14, 16 are stowable over the main body unit 12 in a substantially coincident plane underlying the lid member 18. Furthermore, the lid member 18, when deployed to the open position as shown in FIG. 1, is preferably angularly displaced through an arc greater than 90° and approximately 110° rearwardly from a horizontal plane passing through the main body unit 12 to prevent accidental lid closure. This orientation also facilitates working access to the contents stored within the lid member 18.

In this regard, an interior portion is subdivided by a plurality of partition walls 28 to form several compartments defining storage spaces 30. A set of transparent plastic swing-out cover members 32, are hingedly attached along a lower edge of each of the storage spaces 30. The extent of swingable displacement is limited by a flexible bead-link chain 34 attached at one end to the cover member 32 and at the other end to the partition wall 28. The cover members 32 are held in a closed position by magnetic latches, Velcro pads or similar fasteners (not shown).

The wing tray units 14, 16, are hingedly attached to the main body unit 12 along opposite side edges. The tray units 14, 16 are also subdivided into several compartments 17 for storage of assorted articles. For example, the compartments 17 are designed to hold a hook box, fish hooks and other supplies. The wing tray units 14, 16 are additionally provided with a set of transparent removable cover members 35, 36, 37. Each of the cover members 35, 36, 37, close upon rest posts, e.g. ⅜ diameter wood dowels installed vertically at the corners of the compartments 17, and is held in the closed position by Velcro pads. A bead-link chain hinge 38,40 permits the swingable displacement of the respective cover members 35, 36, 37.

The cover members 35, 36, 37 are further provided with a set of finger grip holes 44 for facilitating placement and the bead-link chain hinge 38, 40 permit the cover member 34, 36, 37 to hang loosely over the side of the respective wing tray unit 14, 16 in a substantially vertical position thus reducing the clearance space required when deploying the workbench 10. A transparent hinged cover member 42 is closeable over another portion of the respective wing tray units 14, 16. The cover members 42 is also secured in the closed position by use of Velcro or equivalent fastener devices.

The main body unit 12, as shown in FIG. 2, is divided into a right-hand and a left-hand compartment 43, 45 by a center partition wall 41. The compartments 43, 45 are substantially identical in size and are further subdivided by a wall 41A, 41B and 41C. A set of removable cover panels 46, 47, 48, 49 are installed over the respective compartments 43, 45 to provide a smooth, flush substantially horizontal work surface. The cover panels 46–49 can for example, have a Formica laminate finish and are supported by rest posts (not shown) secured in the corners of each of the compartments 43, 45 or by a similar construction.

The cover panel 46 is further provided with an array of wood dowels 50 that function as a spool holder. In the preferred embodiment, a total of 15 dowels each having a dimension of 5/16" diameter by ½ length are arranged in 3 rows of 5 each. The dowels 50 are each adapted to engage and firmly hold a spool of thread 52 for use in the fly-tying procedure. Each of the dowels 50 have an end embedded in the underside of the cover panel 46 and are accessible to the user when the cover panel 46 is turned over, as shown in FIG. 2. When the workbench 10 is not being used, the cover panel 46 is lifted up and reversed and the spools of thread 52 are concealed for storage within the right-hand compartment 43.

In addition, the main body unit 12 is partitioned by the walls 41 and 41B to define a tool compartment 54 and a cement/solvent compartment 56. The compartment 56 is adapted to accommodate standard-size cement and solvent containers 58. The tool compartment 54 is adapted to receive a tool block 60 having tool accommodating sockets 62. The tool block 60 is formed with a pedestal 64, such that when the tool block 60 is operational, as shown in FIG. 2, it is supported upon the partition walls 41, 41B within the tool compartment 54, for elevating the tool block 60 above the surface of the cover panel 48. When the tool block 60 is not in use, it is inverted and after the tools have been removed, seated within the tool compartment 54, with the pedestal 60 resting on the partition walls 41, 41B and lying coincident to the plane of the cover panel 48.

A positioning peg 142 projects from an upper edge of the center partition wall 41 at the intersection with the wall 41B, a distance corresponding to the thickness dimension of the cover panels 47, 48. The peg 142 is used for facilitating aligned placement of the cover panels 47, 48 and the tool block 60. In this regard, a corner of each panel 47, 48 is provided with a corner pocket 47A, 48A, and a corner of the pedestal 64 has a pockets 64A. The pockets 47A, 48A and 64A conform generally to an arc constituting a ¼ the circumference of the peg 142. The purpose of the peg 142 is to readily locate the corresponding panels 47, 48 and pedestal 64 about the common point occupied by the peg 142. In the event it is desired to relocate the block 60 to the cement/solvent compartment 56 an opposite corner on the same short side of the pedestal 64 is provided with a corner pocket 64B.

The left-hand compartment 45 of the main body unit 12, is adapted for stowage of a fly-tying vise 66, such as manufactured by Regal Engineering, Inc., Orange, Mass., Model no. RCS-5. A clamp assembly 67, as shown in FIGS. 3 and 4, is secured through an opening in the partition wall 41A and is designed to support the vise 66 in a multiplicity of operational positions and alternatively, in a locked and stowed mode.

The fly-tying vise 66, as is commercially available, includes a set of gripping jaws 70 and a supporting stem 72. The stem 72 commonly has a ⅜" diameter shaft, and is held by the clamp assembly 67 through the cooperative action of a main clamp-half 74 and a right shoulder ring 76. The main clamp-half 74 includes an internally threaded bore 75 extending from one end along a longitudinal axis of a shank 77. The clamp-half also has an integral head 78 at the other end. The shoulder ring 76 is slideably displaceable over the shank portion 77. An aperture 80 extends transversely through the clamp-half 74 at the interface between the head 78 and the shank 77 and defines a substantially semicircular recess 79 in the head 78. A complimentary semicircular recess 83 is formed in the shoulder ring 76. Alternate arrangements can include complementary V-shaped notches or similar grooves in lieu of the semicircular recess 79, 83. The shoulder ring 76 is positionable along the shank 77 with the recesses 79, 83 in confronting relationship and the recess 83 aligned with the aperture 80.

The clamp assembly 67 is secured to the partition wall 41A by utilizing a set of wall plates 84, 86 on opposite sides of the wall 41A, held by a corresponding set of mounting screws 88, 89. The plates 84, 86 have corresponding apertures 85, 87 alignable with an opening (not shown) in the partition wall 41A. An operating lever ring 90 is secured to an operating bolt 91 and for that purpose a transverse threaded bore 92 in the lever ring 90 is adapted for receiving a threaded end 94 of an operating lever 96 and to lock the lever ring 90 to the bolt 91. A nylon spacer washer 98 and a left shoulder ring 100 are slidably positioned on the operating clamp bolt 91 between the operating lever ring 90 and the wall plate 86. The shoulder ring 100 includes a flange 102 adapted for engagement within the aperture 87 for bearing against the wall plate 86 when the bolt 91 is tightened.

Figure 3:
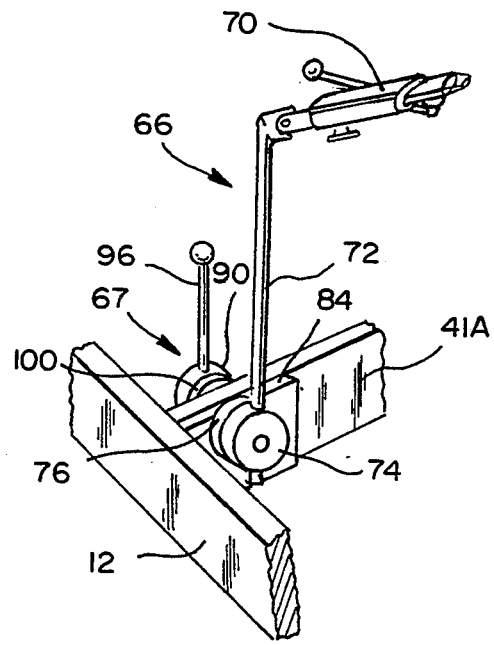
FIG. 3 is an isolated view in perspective to an enlarged scale showing the clamp assembly mounted through a partition wall with the fly-tying vise being secured in an operational position.
Figure 4:
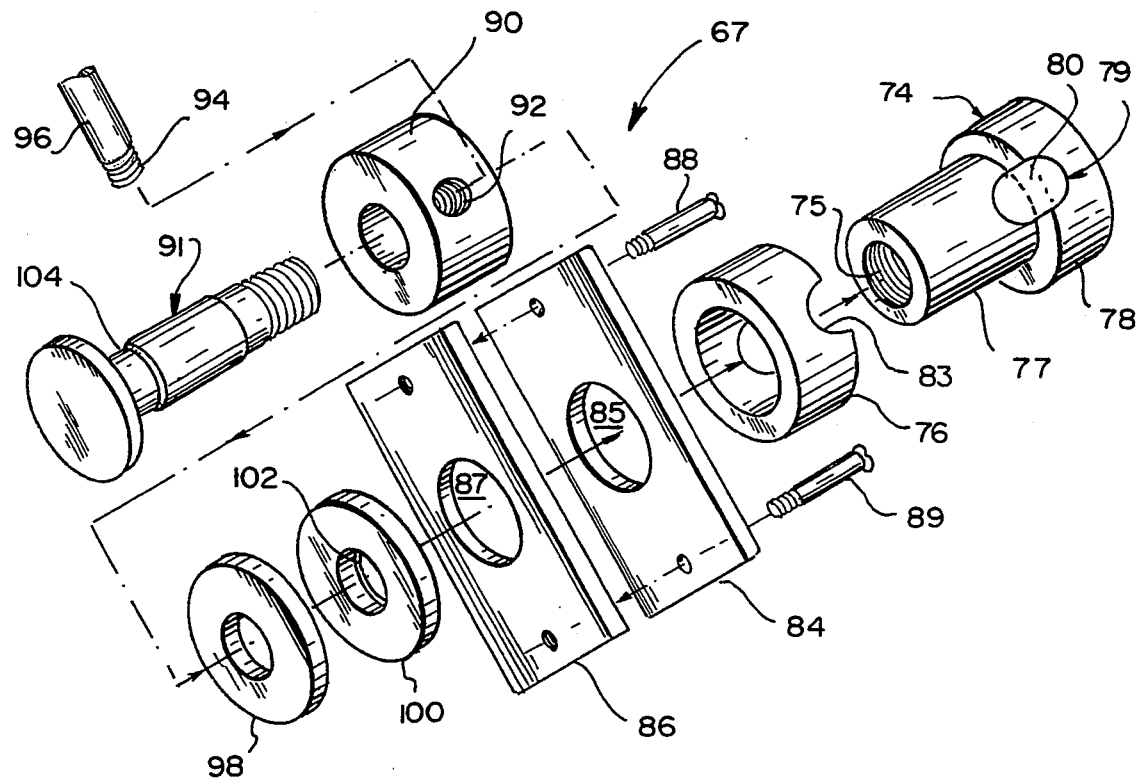
FIG. 4 is a perspective view, in exploded fashion, further illustrating by broken line arrows, the arrangement of the components of the clamp assembly.

The clamp assembly 67 is operated by initially rotating the vise stem 72 and attached gripping jaws 70 in a counterclockwise direction from the stowage position (as shown in FIG. 2) to an operating position (as shown in FIG. 3). It should be noted that rotation of the stem 72 will also rotate the main clamp-half 74 and will thus partially unthread the bolt 91 from the main clamp-half 74 and will release the clamping action between the right shoulder ring 76 and the clamp-half 74. The stem 72 can thus be rotated within the aperture 80 both in an axial direction for height adjustment and in a rotational direction about a transverse axis passing through the stem 72 for adjusting the location of the gripping jaws 70. The stem 72 can then be locked in position by raising the operating lever 96 in a clockwise direction to a substantially vertical position as shown in FIG. 3. The rotation of the lever 96 will concurrently rotate the operating clamp bolt 91, which is locked through the operating lever ring 90 by the threaded end 94 bearing against a groove portion 104 of the operating clamp bolt 91. Preferably a ¼ turn or 90° rotation of the lever 96, to a vertical position as shown in FIG. 3, will effectively clamp the stem 72 between the recesses 79, 83 formed in the clamp-half 74 and right shoulder ring 76. It should be noted that appropriate "cut-outs" are provided in the cover panels 48, 49 for accommodating the stem 72 and operating lever 96 respectively.

When it is desired to place the vise 66 in the stowed position, the operating lever 96 is rotated in a counterclockwise direction thus partially unthreading the bolt 91 from the main clamp-half 74. The stem 72 is then rotated in a clockwise direction and returned to the stowed position as shown in FIG. 2. This movement will retighten the threaded interconnection between the operating bolt 91 and the clamp-half 74 and will effectively lock the vise 66 in the stowed position.

Figure 5:
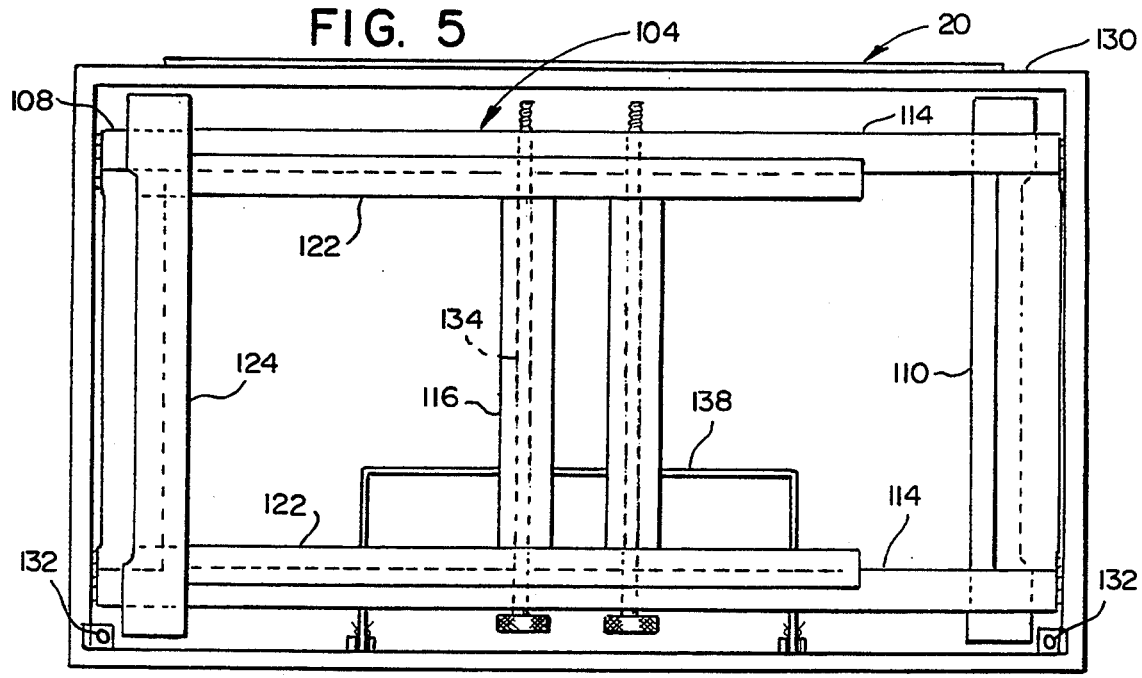
FIG. 5 is a sectional view, to an enlarged scale, taken substantially along lines 5—5 of FIG. 1, showing a fold-out leg assembly in a stowed position.
Figure 6:
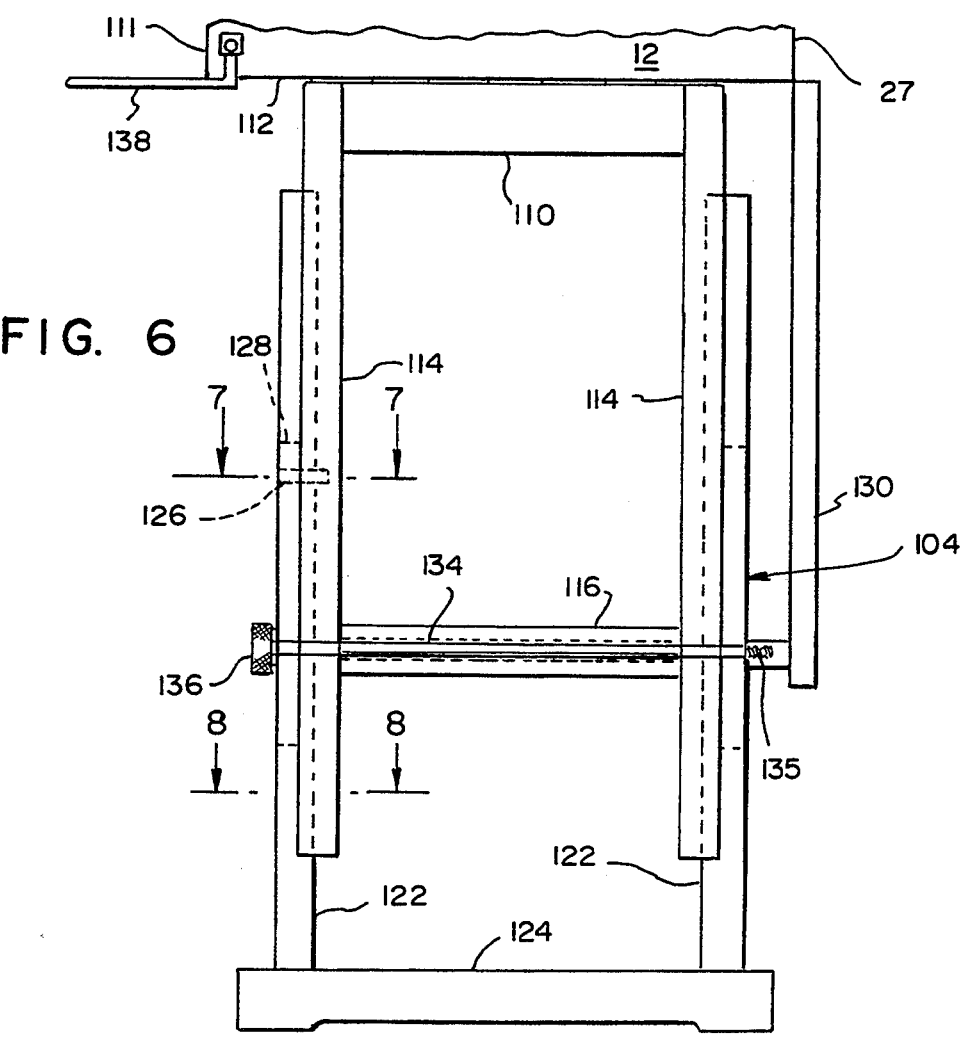
FIG. 6 is an elevational view, showing the leg assembly fully deployed.

Focusing now on the leg compartment 20, a fold-out leg assembly 104 is stowed therein. As shown in FIGS. 5 and 6, the leg assembly 104 includes a set of leg members 106, 108. The description and operation of the leg assembly 104 will be made with reference to the set of leg members 106, it being understood that the set of leg members 108 is of similar construction and operates in the same manner.

Figures 2A, 7, 8:
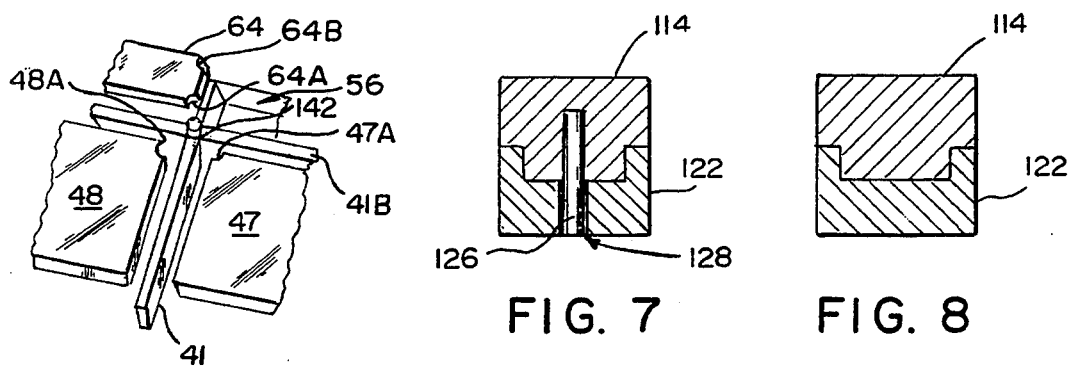
FIG. 2A is an isolated perspective view illustrating a positioning peg for aligning placement of cover panels.
FIG. 7 is a cross-sectional view taken substantially along line 7—7 of FIG. 6, showing a height stop pin of the leg assembly.
FIG. 8 is a cross-sectional view taken substantially along line 8—8 of FIG. 6, showing the mating engagement between an upper and a lower leg member of the leg assembly.

The leg members 106 includes a cross member 110 that is hingedly connected to a side panel 112 of the main body unit 12. An upper leg component 114 is affixed to and extends from the cross member 110. A spacer brace 116 extends between the upper leg components 114 for providing added rigidity. Furthermore, the upper leg component 114 is designed to matingly engage a lower leg component 122, as best shown in FIG. 8. A base member 124 spans between two lower leg components 122.

Height adjustment is achieved by a pre-set stop pin 126 projecting through a guideway 128. The stop pin 126, as shown in FIGS. 2 and 7, is secured to the upper leg component 114. It should also be noted that the height adjustment structure can be modified for establishing random height stops.

A leg compartment cover 130 is hingedly attached to the back wall 27 of the main body unit 12, as shown in FIG. 6, and further includes a set of locking bar sockets 132 at opposite lower corners of the cover 130. The leg members 106, 108 are selectively displaceable through an arc of 90° from a horizontal plane passing through the main body unit 12 to a fully extended position, as shown in FIG. 6. A locking bar 134, which extends through the spacer brace 116, includes a threaded portion 135 at a distal end that is engageable within the locking bar socket 132 by use of a knurled knob 136 at a proximal end. When it is desired to stow the leg assembly 104, the locking bar 134 is removed from the socket 132 using the knurled knob 136 and the lower leg component 122 is slidably displaced toward the upper leg component 114. The respective leg members 106, 108 are then folded into the leg compartment 20 as shown in FIG. 5.

Another aspect of the invention is a waste bag frame assembly 138. The frame assembly 138 is hingedly connected to the inside of a front panel 111 of the main body unit 12, as shown at in FIG. 5, for stowage in the leg compartment 20. The frame assembly 138 is further displaceable to an operable position extending forwardly from the main body unit 12 as shown in FIGS. 2 and 6. A plastic waste bag 140 can be suspended from the frame assembly 138 as illustrated in FIG. 1.

The workbench 10 can optionally be equipped with an electrical outlet or coupler for providing electrical power to a worklight (not shown) such as a low-voltage goose-neck lamp.

Although the clamp assembly 67 has been described with regard to a right-handed user configuration, the clamp assembly can be installed, in the right-hand main body compartment 43 for a left-handed user, by reversing the thread direction on the operating bolt 91 and in the bore 75 formed in the shank 77.

Furthermore, the clamp assembly 67 can be compensatingly adjusted for accepting the vise stem 72 and/or vise stems of variant diameters. This is accomplished by removing the operating lever 96 from engagement with the lever ring 90, and by finger-tightening the operating bolt 91 within the bore 75. The lever ring 90 is then secured to the operating bolt 91 using the operating lever 96 such that a quarter-turn rotational displacement of the operating lever 96, that is, from the horizontal stowed position to the vertical locking position, will clampingly engage the stem 72.

It should thus be seen that there is provided a combined workbench and carry-case which achieves the various objects of this invention and which is well adapted to meet conditions of practical use.

Since various possible embodiments might be made of the present invention or modifications might be made to the exemplary embodiment set forth, it is to be understood that all materials shown and described in the accompanying drawings are to be interpreted as illustrative and not in a limiting sense.

Having thus described the invention, there is claimed as new and desired to be secured by Letters Patent:

1. A combined workbench and carry-case adapted for fly-tying, comprising a main body unit defining a work surface, said main body unit including at least one stowage compartment below said work surface, said stowage compartment being adapted to accommodating a fly-tying vise, means for securing the vise in an operational mode projecting above the work surface and in an alternate stowed mode below the work surface, a lid member hingedly attached to the main body unit, and lid member being selectively swingable to an operative position extending upwardly from the main body unit, said lid member further being adapted for closure in an overlying interlocked relationship with regard to the main body unit for conversion to a carry-case.

2. A combined workbench and carry-case as claimed in claim 1 further including at least one wing tray unit, said wing tray unit being hingedly attached to the main body along a side edge of the main body unit, said wing tray unit further being swingable displaceable to a stowed position overlying the main body unit and under the lid member.

3. A combined workbench and carry-case as claimed in claim 2 wherein the wing tray unit is deployable from the stowed position to an operative position lying substantially coincidental to a horizontal plane defining the work surface of the main body unit.

4. A combined workbench and carry-case as claimed in claim 2 wherein two wing tray units are provided on respective sides of the main body unit, said wing tray units having a length dimension corresponding substantially to one-half the length dimension of the main body unit wherein said wing tray units are stowable over the main body unit in a substantially coincident plane underlying lid member when in a stowed mode.

5. A combined workbench and carry-case as claimed in claim 1 wherein the lid member is displaceable from a stowed position to an operational position wherein the lid member is inclined rearwardly at an angle greater than 90 degrees from a horizontal plane of the main body unit.

6. A combined workbench and carry-case as claimed in claim 1 including a fly-tying vise having a support stem, securing means including a clamp assembly being mounted to a partition wall of said main body unit, said clamp assembly further including an operating bolt on one side of the partition wall and a clamp-half and cooperating shoulder ring on an opposite side of said partition wall, said operating bolt being threadably engageable within said clamp-half, said vise stem being accommodatably positioned between the clamp-half and the shoulder ring, whereby rotation of the operating bolt is effective for clampingly engaging the stem between the clamp-half and the slidable shoulder ring.

7. A combined workbench and carry-case as claimed in claim 1 further including a leg compartment formed integrally with the main body unit and adapted for stowing a fold-out leg assembly, said leg compartment further including a swingable cover member for accessing the leg assembly.

8. A combined workbench and carry-case as claimed in claim 7 wherein said fold-out leg assembly includes a set of leg members, said leg members being secured to a back panel of said main body unit, said leg members further including an upper leg component and lower leg component, said leg components being slidable interconnected for height adjustment.

9. A combined workbench and carry-case as claimed in claim 8 further including a locking bar, said locking bar being disposed transversely through said leg members of said set, said locking bar including an end portion, said cover member being provided with a lock bar socket, said end portion of said locking bar being receivable within said socket when the cover member is in an open position for stabilizing the leg set with respect to said cover member.

10. A combined workbench and carry-case as claimed in claim 1 further including a waste bag frame assembly, said frame assembly being secured to the main body unit, said frame assembly further being swingably displaceable from a stowed position within the leg compartment to an operative position extending forwardly of the main body unit, said frame assembly being adapted for releasably supporting a waste bag in an open position to receive waste materials.

11. A combined workbench and carry-case as claimed in claim 1 further including a cover panel, said cover panel being adapted for placement over the storage compartment of the main body unit, said storage panel further including a plurality of dowels projecting normally from a surface of the cover panel, said dowels being adapted for engagingly receiving a corresponding spool of thread, said cover panel being adapted for removal and replacement over the storage compartment with the dowels projecting downwardly and into the storage compartment when in a stowed mode.

12. A combined workbench and carry-case for fly-tying, said workbench including a fly-tying vise having a set of gripping jaws supported by a stem member, said workbench comprising main body means for defining a work surface, a clamp assembly for positioning the vise above the work surface, said clamp assembly being attached to a wall on the main body, said clamp assembly including a clamp-half and a shoulder ring on a first side of the wall, said clamp-half and shoulder ring being adapted to receive the stem member therebetween, an operating bolt on a second side of the wall, said operating bolt extending through the wall for engagement with the clamp-half, said operating bolt being adapted for selective rotational displacement in a first direction about a longitudinal axis passing through the bolt, said displacement being effective for urging the clamp-half against the shoulder ring to effect a clamping action on the stem for securing the vise in an operative position.

13. A combined workbench and carry-case as claimed in claim 12 wherein the clamp-half includes a shank portion and a head member at an end of the shank portion, said shoulder ring being slidably mounted on the shank portion of the clamp-half.

14. A combined workbench and carry-case as claimed in claim 13 wherein the shank portion includes an internally threaded bore for threadable engagement with the operating bolt.

15. A combined workbench and carry-case as claimed in claim 14 further including a stem receiving aperture extending transversely through the clamp-half at the interface between the head member and the shank portion and defining a substantially semi-circular recess in the head member.

16. A combined workbench and carry-case as claimed in claim 15 wherein the shoulder ring defines a complementary semi-circular recess positionable in confronting relationship with respect to recess in the head member and alignable with the aperture extending through the shank portion.

17. A combined workbench and carry-case as claimed in claim 16 further including a lever ring member mounted on the operating bolt on the second side of the wall, said lever ring being adapted to receive an operating lever projecting transversely with respect to a longitudinal axis passing through the bolt.

18. A combined workbench and carry-case as claimed in claim 12 wherein the main body means also defines a stowage area, said stowage area lying below the work surface, said clamp assembly being adapted for lockingly securing the fly-tying vise in the stowage area.

19. A combined workbench and carry-case as claimed in claim 18 wherein said operating bolt is rotational displaceable in a second direction for releasing the clamping action whereby said vise is swingably displaceable into the stowage area, said clamp-half being rotationally displaceable for lockingly securing the vise in the stowage area.

20. A combined workbench and carry-case as claimed in claim 12 wherein the work surface is defined by removable cover panels, said cover panels being positionable over said stowage area.

21. A combined workbench and carry-case as claimed in claim 20 wherein said stowage area is divided by partition walls, further including a positioning peg projecting from an upper edge of the partition wall a distance corresponding to the thickness dimension of the cover panel, said cover panels having respective corner pockets conforming to the positioning peg for aligning placement around the peg.

22. A combined workbench and carry-case for fly-tying, said workbench including a main body unit defining a work surface, said main body unit including at least one storage compartment below said work surface, said storage compartment being adapted for accommodating a fly-tying vise, a lid member secured to the main body unit for swingable displacement from a closure position overlying the main body unit to an operative position extending upwardly from the main body unit, a leg compartment formed integrally with the main body unit, said leg compartment stowing a leg assembly, said leg compartment including a cover member, said cover member being hingedly attached to and selectively swingable downwardly from the main body member for releasing the leg assembly, said leg assembly being angularly displaceable through an arc of 90° from a horizontal plane passing through the main body unit to an extended position for supporting the main body member.

23. A combined workbench and carry-case as claimed in claim 20 further including stabilizing means for securing the leg assembly in the extended position.

24. A combined workbench and carry-case as claimed in claim 23 wherein the stabilizing means includes a locking bar, said locking bar being engageable with the cover member.

25. A combined workbench and carry-case as claimed in claim 24 wherein the leg assembly includes an upper leg component and a lower leg component, said leg components being slidably interconnected for height adjustment.

* * * * *